Patented Nov. 17, 1931

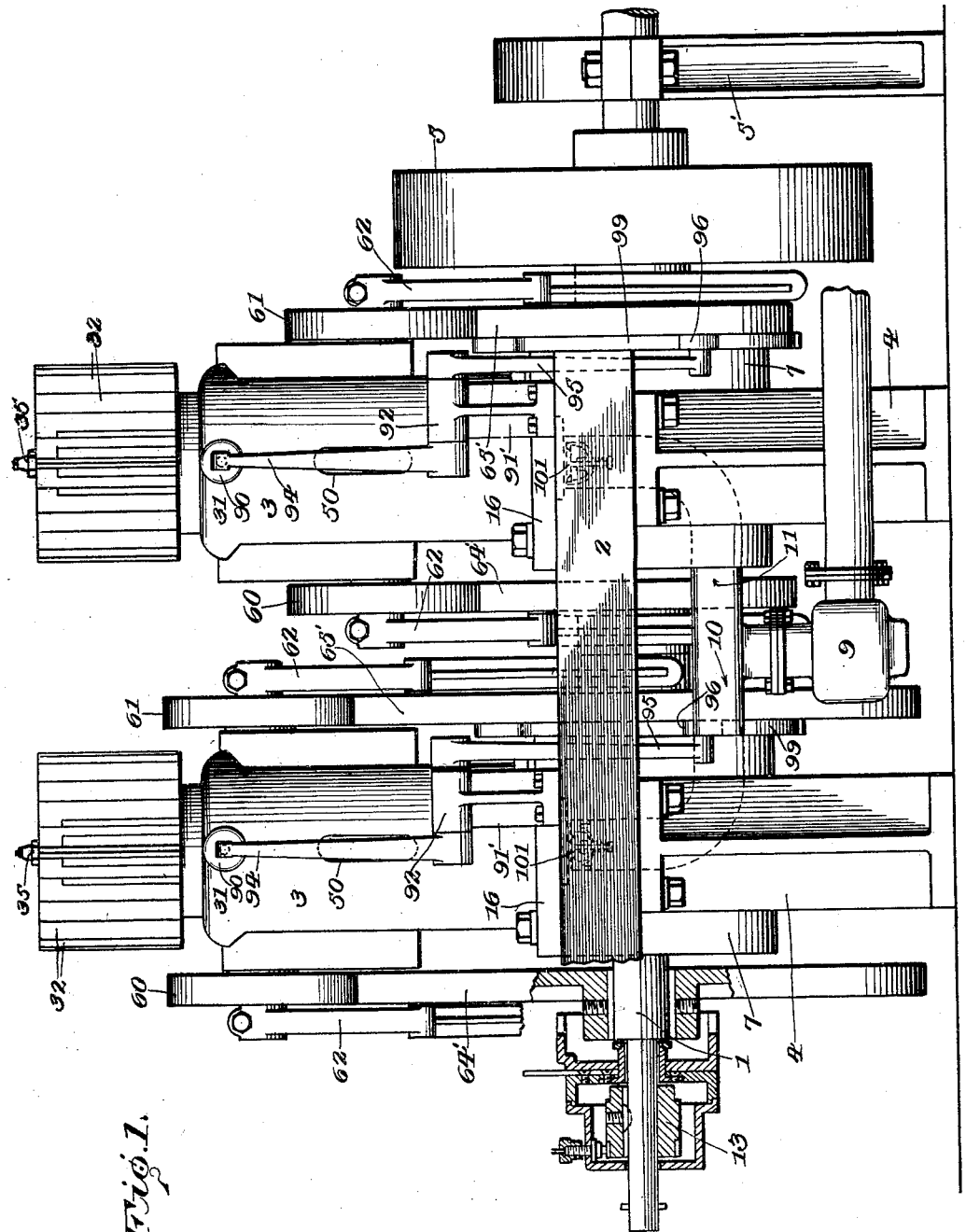

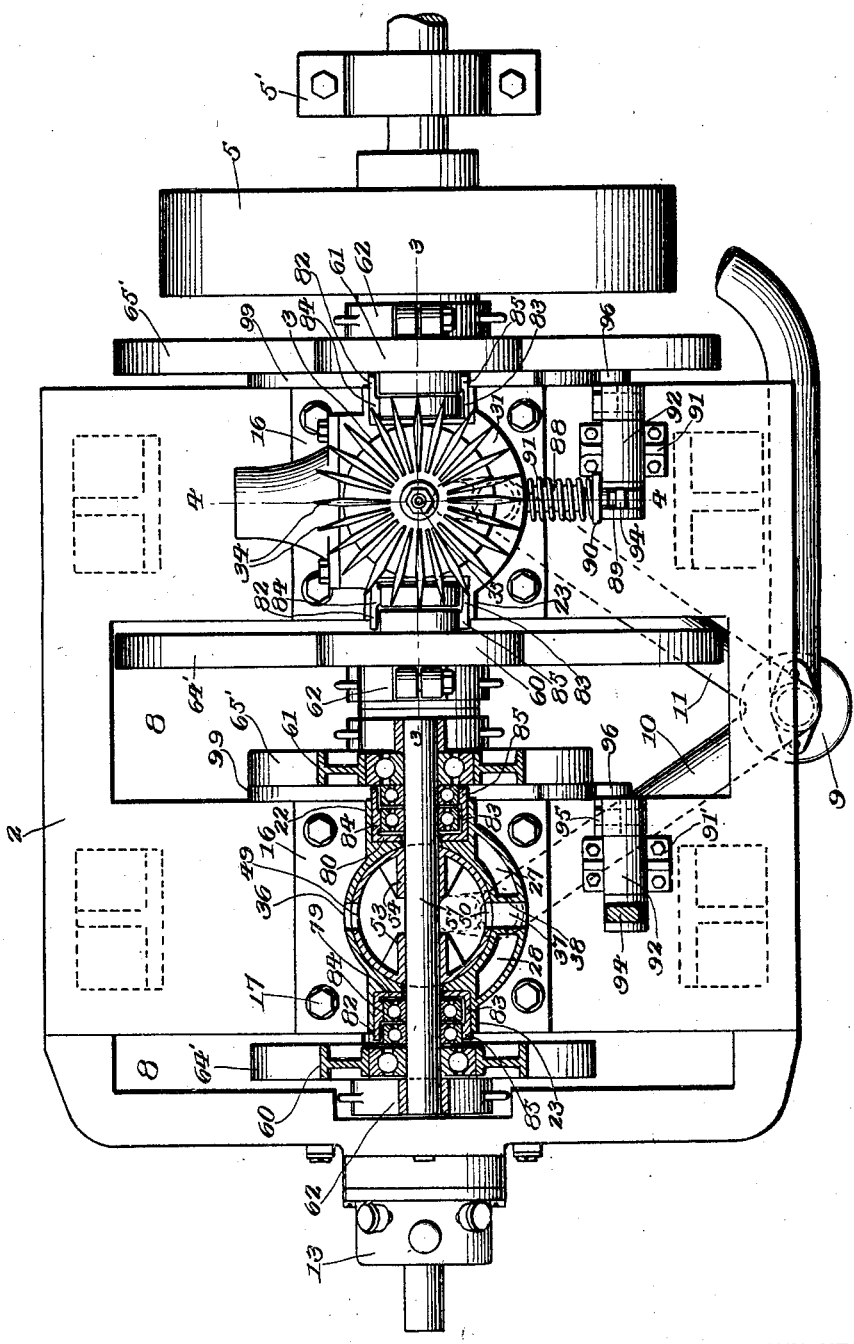

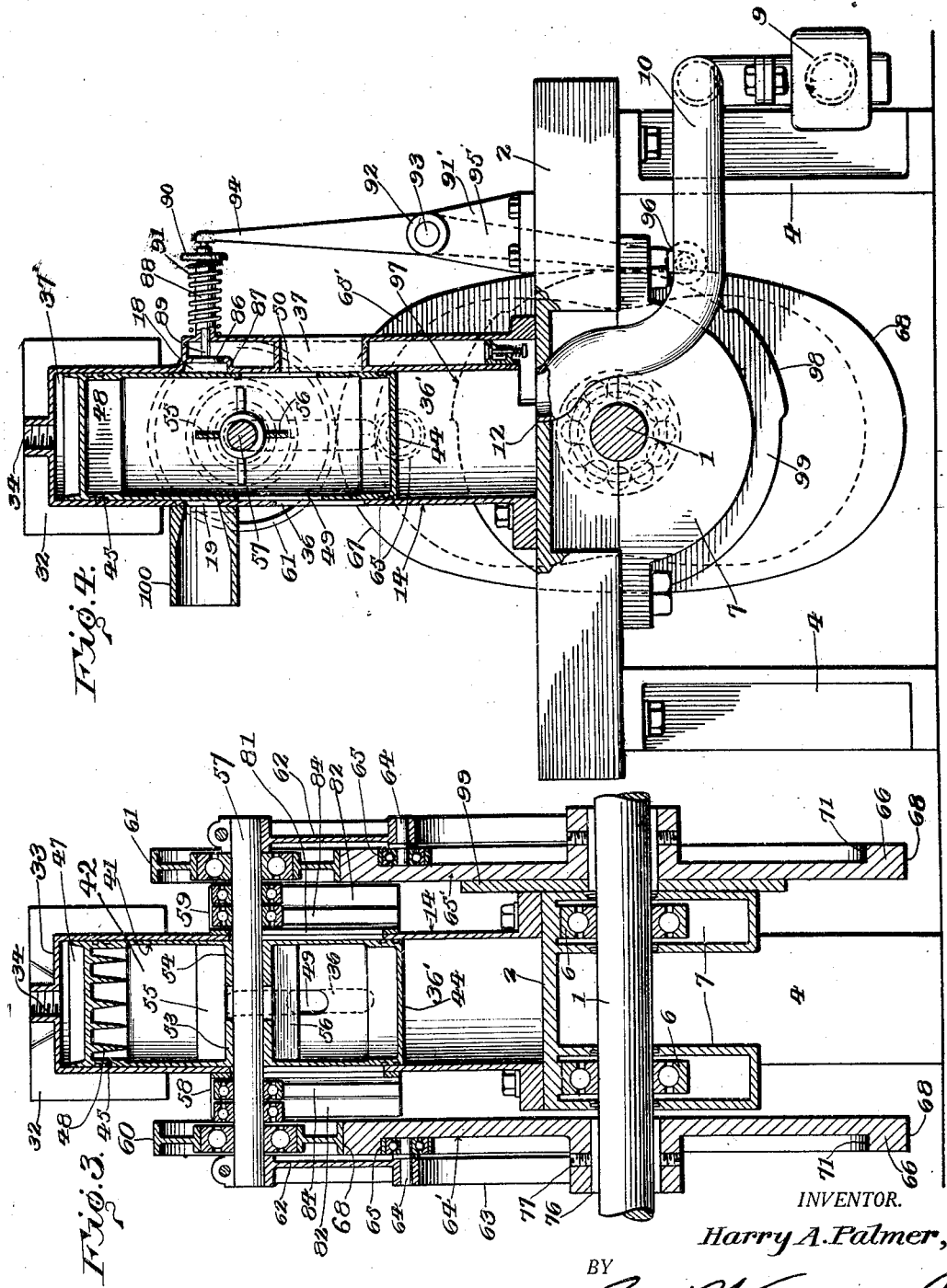

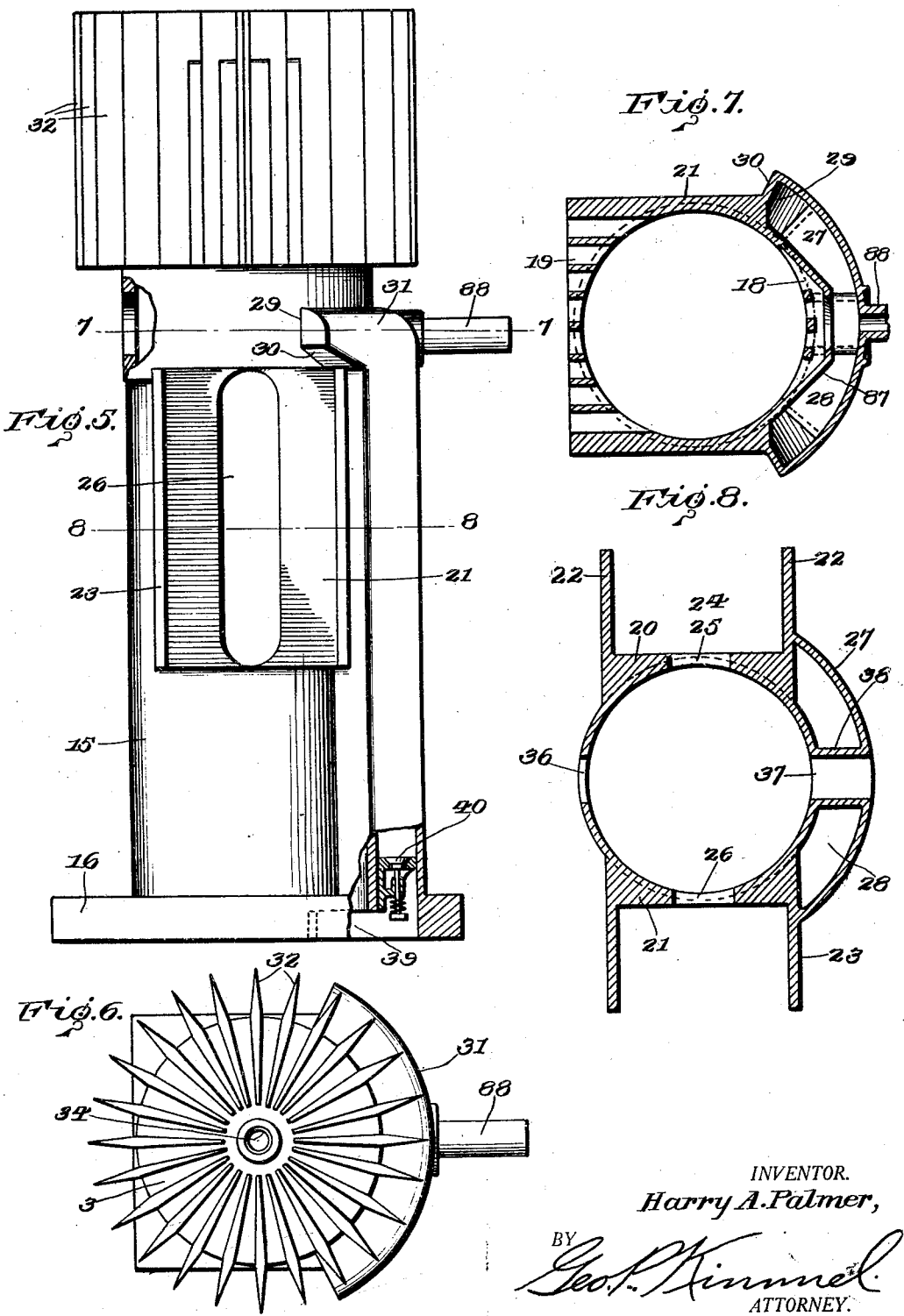

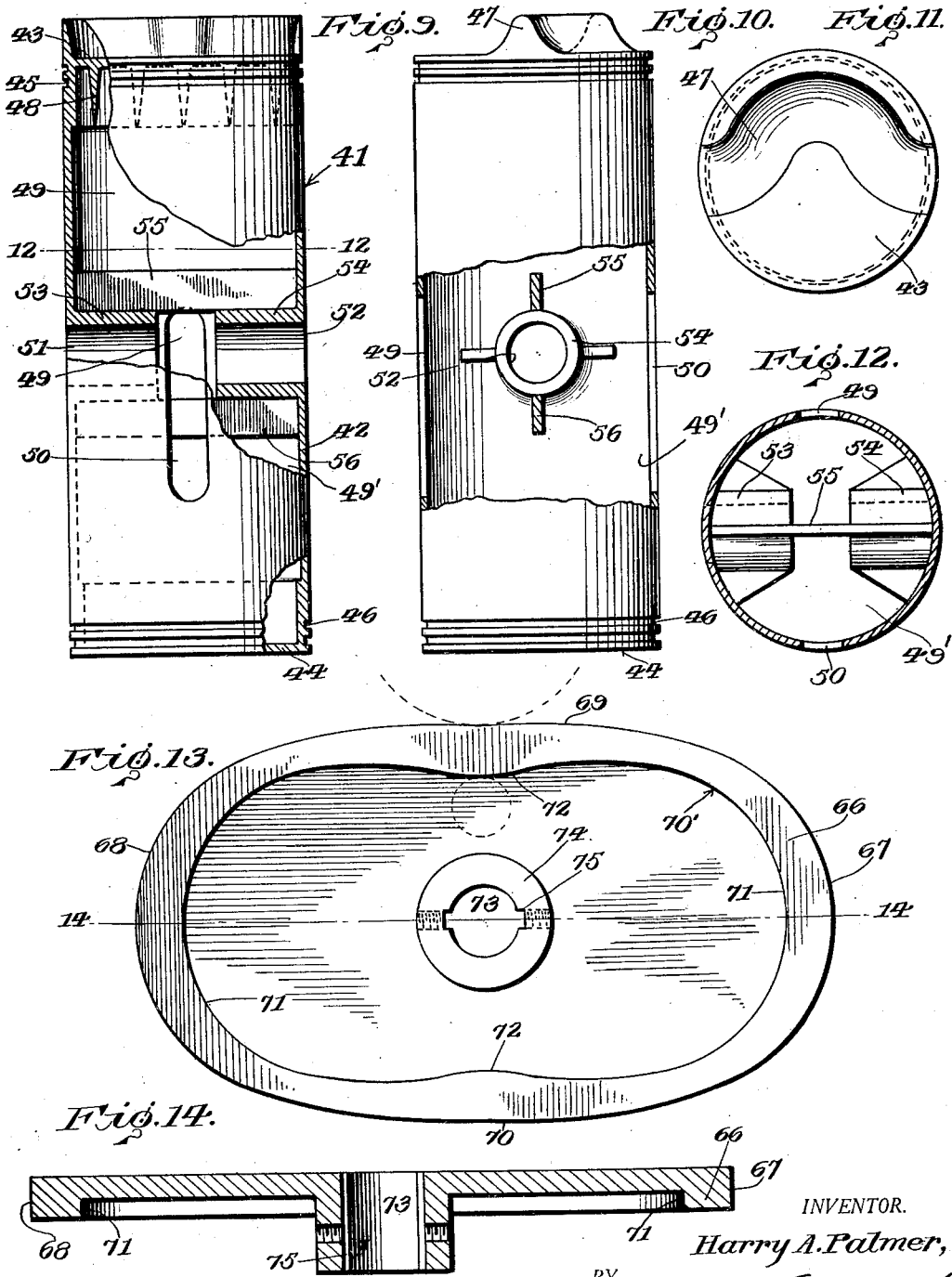

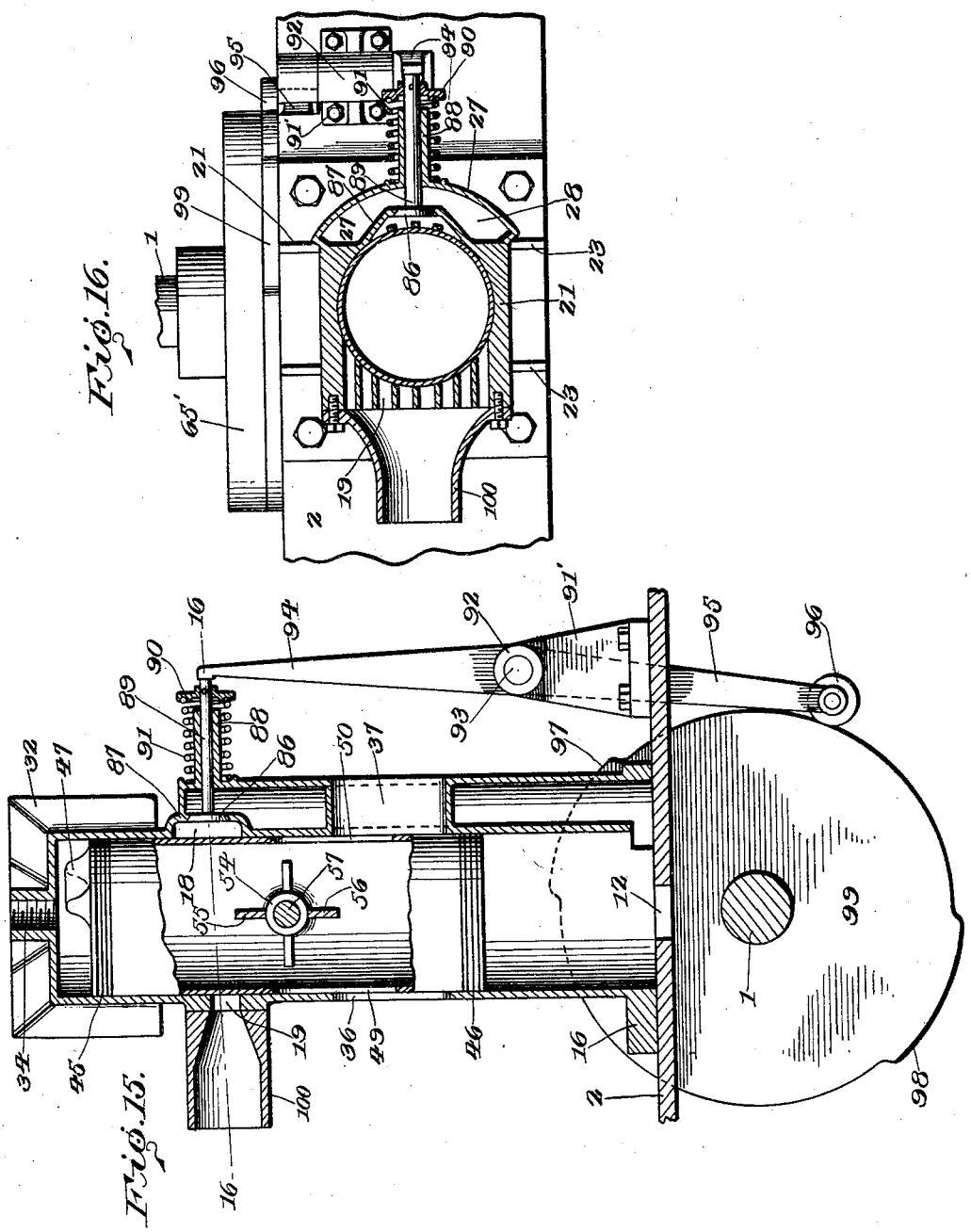

1,832,575

UNITED STATES PATENT OFFICE

HARRY A. PALMER, OF DORCHESTER, MASSACHUSETTS, ASSIGNOR TO PALMER INVENTIONS, INC., OF BOSTON, MASSACHUSETTS, A CORPORATION OF MASSACHUSETTS

INTERNAL COMBUSTION ENGINE

Application filed April 11, 1927. Serial No. 182,806.

This invention relates to internal combustion engines, and has for its object to provide, in a manner as hereinafter set forth, an engine of such type for obtaining maximum efficiency with few working parts as is possible and whereby continuous power is had by obtaining a low speed drive from a high speed piston displacement.

A further object of the invention is to provide, in a manner as hereinafter set forth, an internal combustion engine having the piston thereof air cooled and balanced during its reciprocation and the power therefrom transferred for driving purposes without the employment of piston or connecting or pitman rods, as is now generally the case when driving a power transmitting shaft, as well as further providing for the complete scavenging of the spent gases from the engine cylinder under such conditions increasing the efficiency of the engine.

A further object of the invention is to provide, in a manner as hereinafter set forth an internal combustion engine including shaft impeller means of the rotary type driven from the piston of an internal combustion motor without the employment of connecting or piston rods, and further whereby said impeller means and motor are so constructed and arranged relatively to each other that a plurality of impulses will be had from the motor for said means during one complete rotation of the latter.

A further object of the invention is to provide, in a manner as hereinafter set forth, an internal combustion engine including an air cooled, balanced, reciprocatory piston for driving a shaft impelling means of the rotary type and with the engine constructed and arranged to provide for the power stroke of the piston acting to supply a combustible charge to the combustion chamber of the engine.

Further objects of the invention are to provide an internal combustion engine, in a manner as hereinafter set forth which is comparatively simple in its construction and arrangement, strong, durable, balanced, including an atmospheric air cooled piston, thoroughly efficient in its use, compact, readily assembled, and comparatively inexpensive to set up.

With the foregoing and other objects in view the invention consists of the novel construction, combination and arrangement of parts, as hereinafter more specifically described and illustrated in the accompanying drawings, wherein is shown an embodiment of the invention but it is to be understood that changes, variations and modifications can be resorted to which fall within the scope of the claims hereunto appended.

In the drawings wherein like reference characters denote corresponding parts throughout the several views:

Figure 1 is an elevation of an internal combustion engine in accordance with this invention.

Figure 2 is a top plan view, partly in section.

Figure 3 is a section on line 3—3 Figure 2.

Figure 4 is a section on line 4—4 Figure 2.

Figure 5 is an elevation, partly broken away of a cylinder of the engine.

Figure 6 is a top plan view of the cylinder.

Figure 7 is a section on line 7—7 Figure 5.

Figure 8 is a section on line 8—8 Figure 5.

Figure 9 is a sectional elevation of the piston.

Figure 10 is an elevation of the piston partly broken away.

Figure 11 is a top plan view of the piston.

Figure 12 is a section on line 12—12 Figure 9.

Figure 13 is an elevation of the impeller looking towards the outer side thereof.

Figure 14 is a section on line 14—14 Figure 13.

Figure 15 is a vertical sectional view of a motor partly broken away illustrating the operating means for the intake controlling valve.

Figure 16 is a section on line 16—16 Figure 15.

The internal combustion motors, forming elements of the engine, can be arranged in the form of a horizontally disposed bank, a radial bank or a V-bank, and any number of motors can be employed. As illustrated, by way of example, the engine is shown as consisting of a pair of internal combustion motors arranged in the form of a horizontal bank. Irrespectively of how the motors are arranged, each motor consists of a stationary cylinder and a piston closed at each end and not provided with a piston rod. The piston is hollow. Each cylinder is formed with an intake and an outlet. The intake extends circumferentially of the cylinder and is comparatively narrow. The outlet is much wider than the intake and the function thereof will be hereinafter referred to. Preferably the exhaust port is somewhat larger or of greater area than the intake.

The power transmitting shaft which is operated from the engine is indicated at 1 and can be associated with any number of internal combustion motors, but as illustrated by way of example, the shaft 1 is driven from two internal combustion motors arranged in a horizontal bank. The shaft 1 is supported in any suitable manner below a platform 2 upon which is secured, in spaced relation, the internal combustion motors which are referred to generally by the reference character 3. The platform 2 is mounted upon spaced standards 4. The shaft 1 carries a fly wheel 5. One of the supports of the shaft 1 is indicated at 5. Bearing elements 6 are provided for the shaft 1 and which operate in lubricant reservoirs 7. The platform 2 is formed with openings 8 to provide clearances for the impellers to be hereinafter referred to. A carburetor is indicated at 9 and which is common to the motors 3. An intake conduit leads from the carburetor 9 to each of the motors and said conduits are indicated at 10, 11 and each has its discharge end seated in an opening 12 formed in the platform 2. Each intake conduit opens into the lower end of that motor with which it associates. One end of the shaft 1 can be supported from one end of the platform 2, and is provided with an ignition controlling system as indicated at 13, Figure 1.

As each combustion motor is of like construction but one will be described, as the description of one will apply to the other. Each of said motors includes a stationary cylinder 14 of the desired dimensions and with reference to Figures 5 to 8, both inclusive, the cylinder 14 includes a body portion 15, open at its lower end and at such end formed with a laterally extending continuous flange 16 preferably square in contour and with the front and rear of the flange 16 of greater width than the sides thereof. The flange 16 is secured to the platform 2 by a series of holdfast devices 17. The body portion 15 at a point between its transverse median and its upper end is formed with a bridged intake 18 extending circumferentially thereof and opposite said intake 18, said body portion 15 is provided with a bridged discharge port 19. Preferably the discharge port 19 is of greater width than the intake port 18 to permit on the expansion of gases from the combusted charge to allow for the major portion thereof to exhaust before the intake opens, and with the remaining portion of such gases removed by the incoming charge. The intake 18 is comparatively narrow and acts to hold the pressure of the incoming charge until the exhaust of spent gases is completed. The body portion 15 below said discharge port and at right angles to the latter is provided with enlargements 20, 21 on opposite sides of said body portion and each of said enlargements has formed integral therewith a pair of spaced, opposed lengthwise extending outwardly projecting arms 22, 23. Each enlargement in connection with its pair of arms provides a channel 24 of rectangular cross section and having each of its walls plane. The body portion 15 is formed with a pair of diametrically opposed lengthwise extending slots 25, 26 having their upper ends positioned below the intake and exhaust. Each slot is disposed centrally of an enlargement 20 or 21 and eccentrically with respect to the closed ends of body portion 15. Each slot is of a length substantially equal to the length of the enlargement. The slots 25 and 26 are disposed in the body portion 15 at right angles to the exhaust port 19. Each enlargement has its lower end positioned at a point between the traverse median of the body portion 15 and the flange 16. Formed integral with the arms 23, as well as the body portion 15, above and below the enlargements 20, 21 and also with the flange 16, on that side of the body portion 15 is provided with the intake 18, is a web 27 which forms a bypass 28 for the incoming charge. The web 27 is extended laterally or flared at its upper end, is formed integral with the body portion 15 above the intake 18 and is also integral with the extensions 29, 30 projecting from the body portion 15 adjacent the ends of and below the intake 18. The laterally extended upper end of the web 27 is indicated at 31 and in connection with the extensions 29, 30 incloses the intake 18. The extended upper end 31 is of greater length and height than the length and height of the intake 18, see Figure 7. The body portion 15 above the outlet port 19 is formed with cooling fins 32 which are radially disposed and also extend across the top of the body portion 15. With reference to Figures 3 and 4 the upper end of the body portion 15 is closed, as indicated at 33 and provided with means, as indicated at 34 for connecting a spark plug 35 therewith. The body portion 15 provides a piston chamber 36', and the upper portion thereof, as indicated at 37, forms a space or chamber for combustion. The spark is shown in Figures 1 and 2.

Arranged on that side of the body portion 15 which is provided with the outlet port 19 and below the latter is a slot 36, and diametrically opposite the slot 36 is a slot 37 having registering therewith a tubular member 38 which extends through the by-pass 28. The member is integral with the body portion 15 and the web 27. The slots 36 and 37 are employed in connection with a cooling medium such as air, and co-relate with means formed in the piston, to be hereinafter referred to for cooling the piston during its reciprocations. The slots 36 and 37 are disposed at right angles with respect to the slots 25, 26, see Figure 8.

The flange 16, as well as the body portion 15 is cutaway to provide a passage 39 for establishing communication between the inner or rear end of the piston chamber 36' and the lower end of the by-pass 28. Arranged within the by-pass 28 in proximity to its lower end is a normally seated spring controlled check valve 40 for closing the by-pass 28 to the lower end of the piston chamber 36' when the piston to be presently referred to, is travelling on its compression stroke. On the power stroke of the piston the combustible charge, which is supplied to the inner end of the chamber 36', through the conduit 10, is forced from the chamber 36' and up through the by-pass 28 and into the combustion space or chamber 37' forwardly of the piston and such supply will continue until the piston has closed the intake 18 on the forward movement of the piston. When the piston moves on its compression stroke the combustible charge is drawn into the rear end of the chamber 36' and the valve 40 remains closed and will remain in such position until the power stroke of the piston forces the charge out of the inner end of the piston chamber 36' into the by-pass 28.

Operating within the chamber 36' is a piston referred to generally by the reference character 41, see Figures 3 and 4. With reference to Figures 9 to 12 which clearly shows the construction of the piston, the latter consists of a hollow cylindrical body portion 42, closed at each end by a head, as indicated at 43, 44. The body portion 42 in proximity to the head 43 is formed with peripheral grooves 45 for the reception of packing rings and is also formed in proximity to its head 44 with peripheral grooves 46 for the reception of packing rings. The outer face of the head 43 has an integral curved deflector 47 and the inner face of the head 43 is provided with integral spaced rearwardly extending cooling fins 48. The body portion 42 provides a chamber 49' for the reception of a cooling medium, as air, for the piston and at diametrically opposite points, the body portion 42 is formed with lengthwise extending slots 49, 50, the former adapted to register with the opening 37 in the cylinder and the latter adapted to register with the opening 36 in the cylinder. The slots 36, 37, 49 and 50 provide means for cooling the piston by atmospheric air during the extent of its movements. The body portion 42 at diametrically opposite points is formed with a pair of openings 51, 52 which are disposed at right angles with respect to the slots 49, 50, and integral with the inner face of the body portion at diametrically opposite points, are a pair of oppositely extending ribbed shaped, spaced wrist pin bearing sleeves 53, 54 registering with the openings 51, 52 respectively. Formed integral with the bearings 53, 54 are deflector members 55, 56 arranged in spaced relation and each disposed at the longitudinal median of a wrist pin bearing sleeve. The members 55, 56 provide for the deflecting of the cooling medium, such as air to impact substantially throughout the inner face of the piston. The deflectors 55, 56 are of materially less thickness than the diameter of the opening 52 or inner diameter of the wrist pin bearings. The deflectors are clearly shown in Figures 9, 10 and 12.

With reference to Figures 2, 3 and 4, the wrist pin is clearly shown and indicated at 57 and it is of a length to project a substantial distance, laterally in both directions from the cylinder. The wrist pin 57 extends through the openings 51, 52 of the body portion 42 of the piston, also through the sleeves 53, 54 and through the slots 25, 26 and further projects a substantial distance from each pair of arms 22, 23. The wrist pin 57 is carried by the piston 41, is employed for transferring power from the piston and forms an element of a shaft impeller operating means driven from the motor. The said operating means further includes two pair of bearing rollers, one pair is indicated at 58 and the other pair at 59 and each pair is mounted on the wrist pin 57, as well as being carried thereby. The pairs of roller bearings are positioned on opposite sides of the cylinder of the motor. Carried by the wrist pin 57 and arranged in proximity to each pair of roller bearings, is an operating member. Each operating member is in the form of an annulus mounted on a roller bearing which is positioned on the pin 57 and is carried thereby. One of the operating members is indicated at 60 and is arranged in proximity to the bearing rollers 58 and the other operating member is indicated at 61 and is positioned in proximity to the bearing rollers 59. The operating members 60, 61 provide means for revolving a pair of shaft impellers, to be presently referred to. Carried by the pin 57 at each end thereof, is a holding element for an operating member and which maintains the operating member in rolling contact with an impeller. The holding element comprises an upper portion 62 which is secured to the end of the wrist pin 57, and a lower portion 63 which is adapted to straddle the hub of the impeller. The lower end of the portion 62 carries a stub shaft 64 provided with a roller bearing 65 engaging in the impeller, to be presently referred to.

Driven by the shaft impeller operating means, is a pair of oppositely disposed shaft impellers referred to generally by the reference characters 64', 65' and each of which is fixed to the shaft 1 and said impellers are arranged on opposite sides of the motor. With reference to Figures 13, 14 which illustrates the form of impeller, the latter comprises an oval shaped body portion 66 providing a pair of high parts 67, 68 and a pair of low parts 69, 70. The body portion 66 has its outer face cutaway to form a continuous ridge or cam surface 70, formed with a pair of oppositely disposed end portions of concaved curvature 71 and a pair of oppositely disposed side portions 72 of convex curvature. The body portion 66 is formed with a centrally disposed opening 73 and an integral hub 74, which registers with the opening 73 and projects outwardly from one side of the body portion 67 and beyond the ridge or surface 70. Grooves are provided on the inner face of the hub 74, as indicated at 75 for the reception of keys 76 to secure the impeller to the shaft 1 and retaining screws 77 are carried by the hub and abut against the keys 76. The openings 8 in the platform 2 provide clearances for certain of the impellers during the operation thereof. The roller bearing 65 travels against the ridge 70' and an operating member 60 or 61 travels against the outer edge 78 of the body portion 66. The operating member is of the same width as the width of the edge 68 and is retained thereagainst by the roller bearing 65 in connection with the upper part 62 of the holding element. The forked lower portion 63 of the holding element holds the roller bearing 64 against the ridge or cam surface and takes the twisting pressure from the wrist pin.

Secured within the channels formed by the enlargements 20, 21 and arms 22, 23 are channelled shaped members 79, 80 each formed with a slot 81 registering with a slot 25 or 26. One side of each of said members is indicated at 82 and its other side at 83. The sides 82, 83 of said members have their inner faces provided with lengthwise extending offset bearing surfaces 84, 85 respectively, the former arranged inwardly with respect to the latter. The bearing surface 84 coacts with the inner bearing roller of a pair and the surface 85 with the outer bearing roller of the pair. The members 79, 80 provide guides for the pairs of bearing rollers 58, 59. The bearing surfaces on the inner faces of the sides of the members 79, 80 prevent any possibility of the wabbling or displacement of the piston during its reciprocations, as well as centers the same.

The bridged intake port 18 of the cylinder of each motor is provided with a controlling valve 86 therefor see Figures 4, 15 and 16. Formed integral with the body portion 15 of the cylinder and projecting outwardly from, as well as opposing the intake 18 is a tapered annulus 87 which provides a seat for the valve 86. The web 27 has formed integral therewith an outwardly directed sleeve 88 for the stem 89 of the valve. The stem 89 extends through the web 27 and sleeve 88 and further projects from the latter. The stem 89 has its outer end provided with a collar 90. Mounted on the sleeve 88 and interposed between the web 27 and collar 90 is a coiled controlling spring 91 for the valve 86.

An operating mechanism for the valve 86 is actuated from the shaft 1, and such valve will be given a plurality of impulses, during each complete rotation of the shaft 1 to intermittently open the valve 86 to control the passage of the combustible charge from the by-pass 27, through the intake 18 to the combustion space of the piston chamber. As shown, by way of example, the mechanism provides for the opening of the valve 86 twice during each complete rotation of the shaft 1. With reference to Figures 1, 4, 15 and 16, the said valve operating mechanism comprises a standard 91' provided at its top with a bearing 92. The standard 91' is mounted on the platform 2. Journaled in and of greater length than the bearing 92 is a rock shaft 93 having one end thereof provided with an upstanding crank or kicker arm 94 which has its upper end opposing the outer end of the valve stem 89 for shifting the latter inwardly to open the valve 86, against the action of its controlling spring 91, when the shaft 93 is rocked in one direction. The other end of the shaft 93 is provided with a laterally disposed roller 96 for engagement by the high parts 97, 98 of the cam 99 for the purpose of intermittently rocking the shaft 93 twice during one complete rotation of the cam 99. The cam 99 is keyed to the shaft 1 and abuts against the inner side face of the impeller 65'. The valve 86 is only shifted to open position when the piston is at its dead lower center and therefore all leakage of pressure of the combustible charge in the by-pass 27 will be prevented. Further the valve 86 will prevent any skipping or pre-ignition of the new charge entering the combustion space.

An exhaust conduit 100 is attached to the body portion 15 of the cylinder and leads from the exhaust port 19.

It is thought that the operation of the engine for the purpose of driving the shaft 1 can be readily understood, as on the reciprocation of the pistons, the operating means for the impellers having rolling contact therewith, will impart a rotary movement to the impellers, which in turn will carry the shaft 1 therewith. The operating members 60, 61, will have a continuous rolling contact with the outer edge of the impellers and will be held in such position by the rollers 65 travelling against the cam surfaces 70', formed in the outer faces of the impellers adjacent the outer edges of these latter. By the construction and arrangement of the elements of the engine continuous power is had by obtaining a low speed drive from a high speed piston displacement, and furthermore each piston during its movements is cooled by atmospheric air. The engine construction provides for converting the reciprocatory motion of the pistons, without the employment of piston rods, connecting rods or pitman rods, into rotary motion whereby a power transmitting shaft is driven, and further will prevent the pistons from wabbling or twisting during their operation, as well as providing for a plurality of impulses for each impeller during one complete rotation thereof. The contacting driven and driving parts of the engine, arranged exteriorly of the motors, are provided with roller bearings which reduces friction to a minimum.

The inner end or bottom of each cylinder is closed by the platform 2 so that it retains the charge under pressure and a check valve 101 in by-pass prevents back pressure to the carburetor.

The construction of the impeller will take up the differences in lengths between centers in the pull down member, and give it a true harmonic curve when travelling, keeping the outside roller in contact with the edge of the impeller when motor is skipping so as to cause no knocks.

It is thought that the many advantages of a stationary internal combustion engine, in accordance with this invention, can be readily understood, and although the preferred embodiment of the invention is as illustrated and described, yet it is to be understood that changes in the details of construction can be had which will fall within the scope of the invention as claimed.

What I claim is:

1. An engine comprising a power transmitting shaft, a pair of spaced, opposed, rotatable driving impellers therefor, fixed thereto and each having one face formed with an endless ridge in proximity to its outer edge to provide a cam surface, a stationary internal combustion motor having its inner end opposing and spaced from said shaft and including a reciprocatory piston, said motor positioned between and spaced from the impellers, a wrist pin bodily carried by said piston and projecting laterally from opposite sides of the motor, a roller carried by the wrist pin in proximity to each end thereof and having continuous rolling contact with the outer edge of an impeller for driving it, and means extending from each end of said pin and including a holding element associated with the roller and having continuous rolling contact with an impeller ridge for maintaining the roller in permanent contact with the outer edge of the impeller.

2. An engine comprising a power transmitting shaft, a pair of spaced, opposed, rotatable driving impellers therefor, fixed thereto and each having one face formed with an endless ridge in proximity to its outer edge to provide a cam surface, a stationary internal combustion motor having its inner end opposing and spaced from said shaft and including a reciprocatory piston, said motor positioned between and spaced from the impellers, a wrist pin bodily carried with said piston and projecting laterally from opposite sides of the motor, a roller carried by the wrist pin in proximity to each end thereof and having continuous rolling contact with the outer edge of an impeller for driving it, and means extending from each end of said pin and including a holding element associated with the roller and having a continuous rolling contact with an impeller ridge for maintaining the roller in permanent contact with the outer edge of the impeller, the said holding elements offset with respect to said rollers.

3. An engine comprising a power transmitting shaft, a pair of spaced, opposed, rotatable driving impellers therefor, fixed thereto and each having one face formed with an endless ridge in proximity to its outer edge to provide a cam surface, a stationary internal combustion motor having its inner end opposing and spaced from said shaft and including a reciprocatory piston, said motor positioned between and spaced from the impellers, a wrist pin bodily carried by said piston and projecting laterally from opposite sides of the motor, a roller carried by the wrist pin in proximity to each end thereof and having continuous rolling contact with the outer edge of an impeller for driving it, means extending from each end of said pin and including a holding element associated with the roller and having continuous rolling contact with an impeller ridge for maintaining the roller in permanent contact with the outer edge of the impeller, the sides of said motor through which the wrist pin projects having opposed, stationary guides opposing said wrist pin, and rolling guides mounted on the wrist pin and travelling against said stationary guides, said rolling guides arranged inwardly with respect to said rollers.

4. In an internal combustion engine, an internal combustion motor including a cylinder closed at each end and a reciprocatory piston operating in said cylinder, said cylinder having diametrically opposed slots disposed eccentrically with respect to the closed ends of the cylinder, a pair of substantially oval-shaped, rotatable impellers opposing spaced from and depending from opposite sides of said cylinder exteriorly thereof, said impellers having the axes thereof positioned below the inner closed ends of the cylinder and spaced outwardly with respect to the plane of the cylinder, said impellers aligning with each other and adapted for connection to and for operating a power transmitting shaft, each of said impellers having its outer face formed with an endless ridge in proximity to its outer edge to provide a cam surface having opposed high parts centrally of its sides and opposed lower parts centrally of its ends, a wrist pin bodily carried by said piston, centrally, and projecting laterally through said slots in opposite directions beyond the opposite sides of the cylinder, and impeller driving means carried by the ends of the wrist pin exteriorly of the cylinder and including superposed rotatable elements having continuous rolling contact with the outer edges and the cam surfaces of the impellers for imparting a plurality of impulses thereto during each revolution thereof.

5. In an internal combustion engine, an internal combustion motor including a cylinder closed at each end and a reciprocatory piston operating in said cylinder, said cylinder provided with diametrically opposed lengthwise extending slots, a pair of substantially oval-shaped, rotatable impellers opposing, spaced from and depending inwardly with respect to opposite sides of said cylinder exteriorly thereof, said impellers aligning with each other and having their axes positioned below the inner closed end of the cylinder and spaced outwardly from the plane of the latter, said impellers for connection at the axes thereof to and for operating a power transmitting shaft, each of said impellers having one face formed with an endless ridge in proximity to its outer end to provide a cam surface having opposed high parts centrally of its sides and opposed low parts centrally of its ends, a wrist pin bodily carried by the piston centrally thereof, and projecting through said slots laterally in opposite directions from opposite sides of the cylinder, impeller driving means carried by the ends of the wrist pin exteriorly of the cylinder and having continuous rolling contact throughout the width of the outer edges and width of the cam surfaces of the impellers for imparting a plurality of impulses thereto during each revolution thereof, a pair of spaced opposed guides disposed lengthwise of and projecting laterally from the periphery of said cylinder at opposite sides of a slot, said guides being stationary, and means bodily carried by said wrist pin between the cylinder and each impeller driving means and coacting with said stationary guides to prevent the wobbling or twisting of the piston during the reciprocations thereof.

6. In combination, an internal combustion motor including a cylinder closed at each end and a reciprocatory piston operating in said cylinder, said cylinder having diametrically disposed lengthwise extending slots, a power transmitting shaft positioned below and spaced from the closed inner end of said cylinder and disposed in a direction diametrically with respect to the latter, a pair of spaced, opposed cams fixed at their axes to said shaft and each having one face provided with an endless ridge in proximity to its outer edge, a wrist pin extending transversely of and fixed to said piston, said pin extending through said slots and projecting beyond opposite sides of the cylinder, said cams positioned below the projected portions of said pin and adjacent and spaced from the said opposite sides of the cylinder, rollers carried by said pin adjacent said cylinder and travelling on the outer edges of said cams, and holding means secured to the ends of the wrist pin outwardly with respect to said rollers and travelling against said ridges.

7. In combination, an internal combustion motor including a cylinder closed at each end and a reciprocatory piston operating in said cylinder, said cylinder having diametrically disposed lengthwise extending slots, a power transmitting shaft positioned below and spaced from the closed inner end of said cylinder and disposed in a direction diametrically with respect to the latter, a pair of spaced, opposed cams fixed at their axes to said shaft and each having one face provided with an endless ridge in proximity to its outer edge, a wrist pin extending transversely of and fixed to said piston, said pin extending through said slots and projecting beyond opposite sides of the cylinder, said cams positioned below the projected portions of said pin and adjacent and spaced from the said opposite sides of the cylinder, rollers carried by said pin adjacent said cylinder and travelling on the outer edges of said cams, holding means secured to the ends of the wrist pin outwardly with respect to said rollers and travelling against said ridges, two opposed pairs of guides, the guides of each pair being arranged in opposed spaced relation, integral with the outer face of one side of the cylinder and extending lengthwise of the latter, said guides projecting laterally from the cylinder, and means carried by the wrist pin between the cylinder and rollers and moving against said guides to prevent the twisting of the wrist pin during the operation of the piston.

In testimony whereof, I affix my signature hereto.

HARRY A. PALMER.